(12) United States Patent
Barsi et al.

(10) Patent No.: US 10,058,021 B2
(45) Date of Patent: Aug. 28, 2018

(54) SEEDER WITH METERING SYSTEM HAVING SELECTIVELY POWERED METERING SECTIONS

(71) Applicant: Morris Industries Ltd., Saskatoon (CA)

(72) Inventors: Barry B. Barsi, Yorkton (CA); Jeffrey J. Gordon, Yorkton (CA); John A. Lesanko, Sturgis (CA); Cory W. K. Ochitwa, Yorkton (CA)

(73) Assignee: Morris Industries Ltd., Saskatchewan (CA)

( * ) Notice: Subject to any disclaimer, the term of this patent is extended or adjusted under 35 U.S.C. 154(b) by 0 days.

(21) Appl. No.: 15/436,528

(22) Filed: Feb. 17, 2017

(65) Prior Publication Data

US 2017/0156259 A1    Jun. 8, 2017

Related U.S. Application Data

(60) Continuation of application No. 14/546,878, filed on Nov. 18, 2014, now Pat. No. 9,578,801, which is a division of application No. 13/398,557, filed on Feb. 16, 2012, now Pat. No. 8,915,200.

(60) Provisional application No. 61/444,467, filed on Feb. 18, 2011.

(51) Int. Cl.
*A01C 7/08* (2006.01)

(52) U.S. Cl.
CPC .............. *A01C 7/082* (2013.01); *A01C 7/084* (2013.01)

(58) Field of Classification Search
CPC ........... A01C 7/084; A01C 7/081; A01C 7/08; A01C 7/00; A01C 7/088; Y10S 111/921
USPC ....... 111/200, 900, 921, 922, 170, 177, 185, 111/14, 178
See application file for complete search history.

(56) References Cited

U.S. PATENT DOCUMENTS

| | | | |
|---|---|---|---|
| 8,915,200 B2* | 12/2014 | Barsi | A01C 7/081 111/178 |
| 9,578,801 B2* | 2/2017 | Barsi | A01C 7/081 |
| 2010/0132600 A1* | 6/2010 | Dean | A01C 7/081 111/11 |

* cited by examiner

Primary Examiner — Christopher J. Novosad
(74) Attorney, Agent, or Firm — Hovey Williams LLP

(57) ABSTRACT

An agricultural seeding machine includes a metering system and a damper arrangement. The metering system for the seeding machine includes selectively powered metering sections operable to individually allow or restrict seed dispensation. The damper arrangement is included so that pneumatic conveying of the particulate within the machine is consistently maintained when particulate flow is varied between the metering sections.

9 Claims, 14 Drawing Sheets

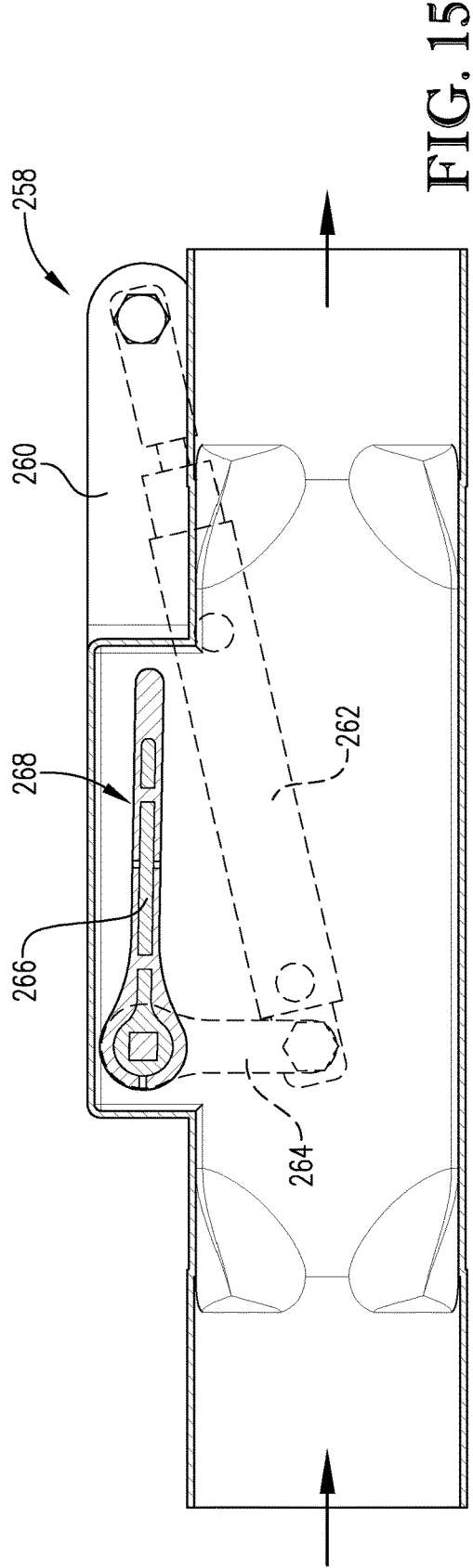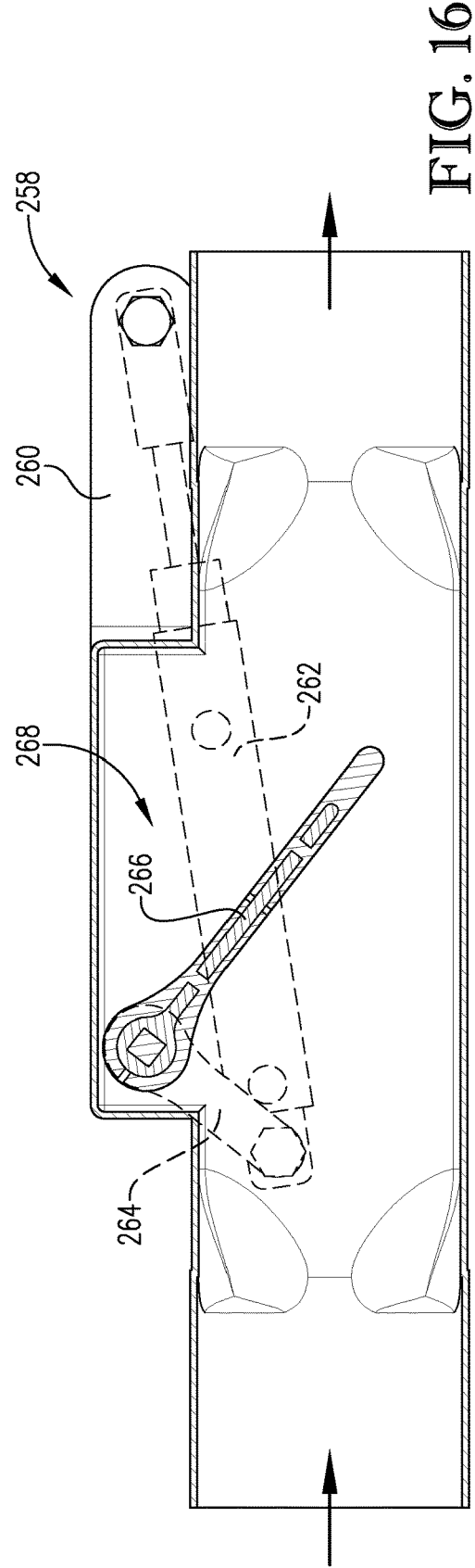

SEEDER WITH METERING SYSTEM HAVING SELECTIVELY POWERED METERING SECTIONS

CROSS-REFERENCE TO RELATED APPLICATION

The present application is a continuation of U.S. application Ser. No. 14/546,878 filed on Nov. 18, 2014, entitled SEEDER WITH METERING SYSTEM HAVING SELECTIVELY POWERED METERING SECTIONS, which is a division of and claims priority from U.S. patent application Ser. No. 13/398,557, filed Feb. 16, 2012, entitled SEEDER WITH METERING SYSTEM HAVING SELECTIVELY POWERED METERING SECTIONS, which claims the priority benefit of U.S. Provisional Patent Application Ser. No. 61/444,467, filed Feb. 18, 2011. The entirety of each of the foregoing applications is hereby incorporated by reference herein.

BACKGROUND OF THE INVENTION

1. Field of the Invention

The present invention relates generally to seeding machines, including seeding machines of a pneumatic type that are commonly referred to as seeders and, more particularly, to seeders having selectively powered metering sections operable to individually allow or restrict seed dispensation.

2. Discussion of the Prior Art

Those of ordinary skill in the art will appreciate that seeders are commonly used in the agricultural industry to dispense particulate materials such as seeds and/or fertilizers into the ground. It is known in the art of seeding to provide a large, high-capacity cart that is towed by a tractor, along with an implement having a multitude of ground-engaging openers that deposit the seeds and/or fertilizers carried by the cart. In the case of air seeders, the seeds and/or fertilizers carried by the cart are typically contained within large tanks or hoppers, with each tank dispensing seed into a collector assembly positioned therebelow. The collector assemblies introduce the streams of material gravitating from the tanks into pneumatic conveying lines that deliver the materials to their ultimate destinations. Metering structure may be provided between each tank and the respective collector assembly to control the rate at which the material enters the collector assembly or to restrict entry of the material into the collector assembly.

SUMMARY

According to one aspect of the present invention, a metering system for use in a particulate delivery system, wherein the particulate delivery system includes a rotatable drive shaft and a tank containing particulate, is provided. The metering system includes a plurality of selectively-powered particulate metering sections, each of which comprises a rotatable metering roller, a rotatable metering wheel, a rotatable engagement wheel, a drive wheel, and a control arm. The metering roller is configured to receive particulate from the tank and is operable to dispense the particulate when rotated and to prevent particulate dispensation when not rotated. The metering roller is configured to rotate with the metering wheel. The engagement wheel is operable to rotate the metering wheel and thereby the metering roller when the engagement wheel and the metering wheel are drivingly interengaged. The drive wheel is configured to be mounted on the drive shaft to rotate therewith. The drive wheel engages the engagement wheel. The control arm shiftably supports the engagement wheel for shifting movement into and out of driving engagement with the metering wheel, such that particulate dispensation is prevented by the metering roller when the engagement wheel is drivingly disengaged from the metering wheel and particulate is dispensed by the metering roller when the engagement wheel is shifted into driving engagement with the metering wheel.

According to another aspect of the present invention, a particulate delivery system is provided. The particulate delivery system includes a tank containing particulate, a rotatable drive shaft, and a metering system. The metering system includes a plurality of selectively-powered particulate metering sections. Each of the metering sections includes a rotatable metering roller, a rotatable metering wheel, a rotatable engagement wheel, a drive wheel, and a control arm. The metering roller is in communication with the tank and is operable to dispense the particulate when rotated and to prevent particulate dispensation when not rotated. The metering roller is configured to rotate with the metering wheel. The engagement wheel is operable to rotate the metering wheel and thereby the metering roller when the engagement wheel and the metering wheel are drivingly interengaged. The drive wheel is mounted on the drive shaft to rotate therewith. The drive wheel engages the engagement wheel. The control arm shiftably supports the engagement wheel for shifting movement into and out of driving engagement with the metering wheel, such that particulate dispensation is prevented by the metering roller when the engagement wheel is drivingly disengaged from the metering wheel and particulate is dispensed by the metering roller when the engagement wheel is shifted into driving engagement with the metering wheel.

According to another aspect of the present invention, a particulate delivery system is provided. The system comprises a tank containing particulate, a plurality of particulate-transporting lines, a metering system, an airflow generator, and a plurality of damper assemblies. The metering system includes a plurality of particulate metering sections. Each of the metering sections is associated with a respective one of the particulate-transporting lines and includes a metering device configured to control dispensation of the particulate from the tank to the respective line. The airflow generator is in communication with the particulate-transporting lines so as to provide pneumatic conveying of the particulate within the lines. Each of the damper assemblies is associated with a respective one of the particulate-transporting lines and is operable to selectively restrict airflow within the respective particulate-transporting line responsive to variations in metering of particulate to the respective particulate-transporting line.

Among other things, the presence of a plurality of selectively powered, independently rotatable metering rollers allows for precise control of the locations onto or into which seed or other particulate materials are dispensed. In one utilization of such precise control, seeding overlap is avoided even in instances in which the machine itself passes more than once over a given stretch of ground, through the rapid, selective stoppage of metering rollers positioned above the given stretch of ground.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 15 is a partially sectioned view of the right side of the damper of FIG. 14 in a disengaged configuration; and FIG. 16 is a partially sectioned view of the right side of the damper of FIGS. 14 and 15 in an engaged configuration.

Figure 1:
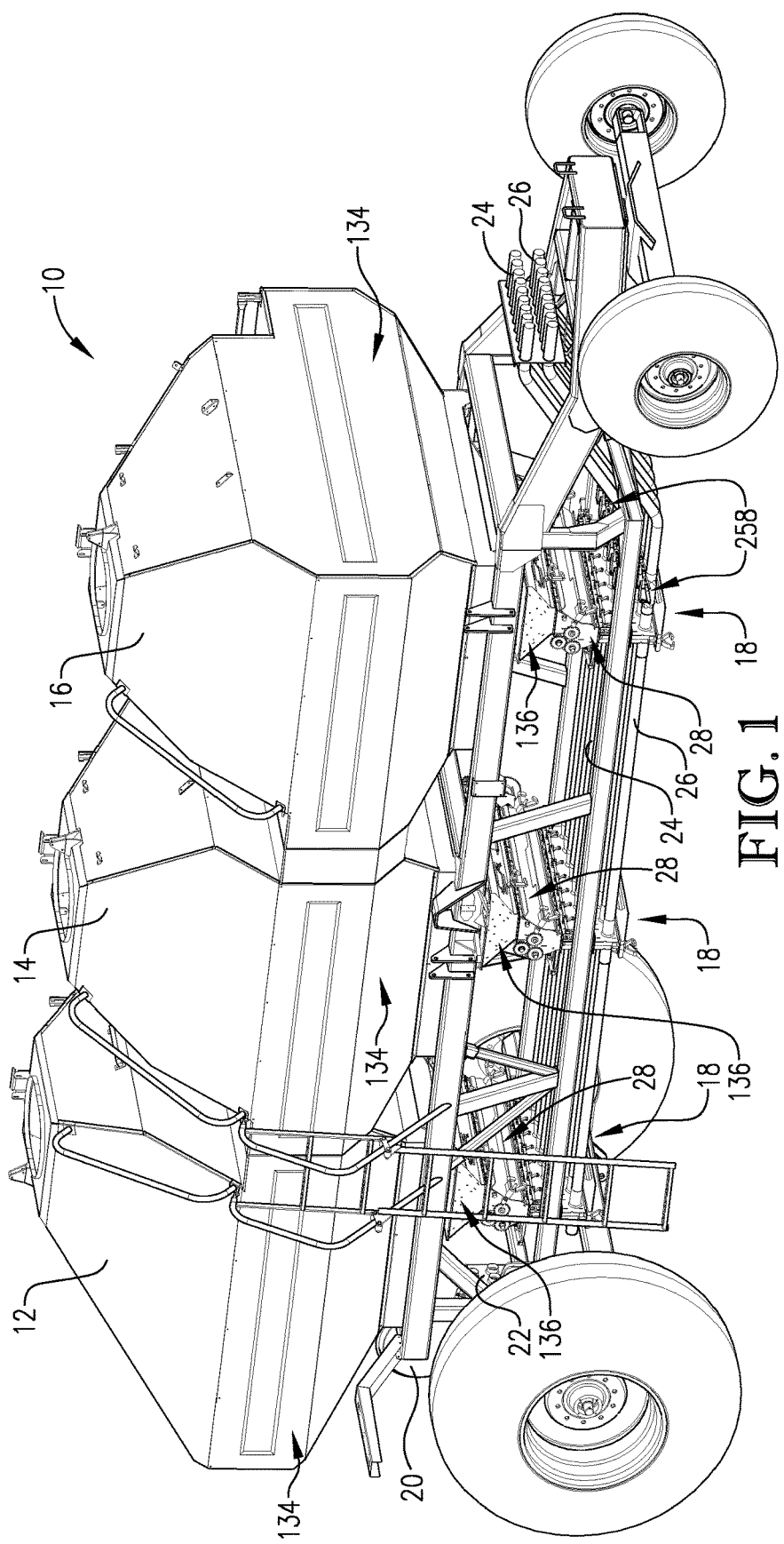
FIG. 1 is a right front isometric view of an air seeder incorporating the principles of the present invention.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, the illustrated machine comprises an air cart 10 that is adapted to be connected in tandem with a towing tractor (not shown) and a planting implement having multiple openers thereon (not shown). Generally speaking, cart 10 supplies seeds and/or fertilizer to the planting implement as the tractor pulls both machines in tandem across a field.

The particular air cart 10 selected for purposes of illustration has three tanks 12,14,16 included as a part thereof, although this number may vary. The tanks 12,14,16 may be used, for example, to separately contain seeds, starter fertilizer, and additional fertilizer or granular inoculant for the soil.

Each of the tanks is provided with its own collector assembly 18 positioned below the respective tank for introducing materials from the tank into a number of conveying air streams. Such air streams are produced by a fan 20 at the rear of the cart that delivers air to a distribution manifold 22. Manifold 22, in turn, directs the powerful air streams into upper and lower primary runs of conveying lines 24 and 26, respectively. The number of upper and lower primary lines 24 and 26, respectively, can vary widely without departing from the scope of the present invention. In the present application, however, a total of nine upper primary lines 24 and nine lower primary lines 26 are shown in FIGS. 1 and 8-10, while eight upper primary lines 24 and eight lower primary lines 26 are shown in FIGS. 2-4 and 7. (FIGS. 5, 6, and 11-16 are generic in this regard.)

Although FIG. 1 illustrates lines 24 and 26 disconnected from the manifold 22, it will be appreciated that, in practice, a section of pipe or hosing extends between such locations to complete each conveying line. From the front of the air cart 10, conveying lines 24 and 26 are coupled with flexible hoses (not shown) that lead to the planting implement, where appropriate divider structure splits each primary stream into a number of secondary product streams leading to individual openers of the implement.

Figure 2:
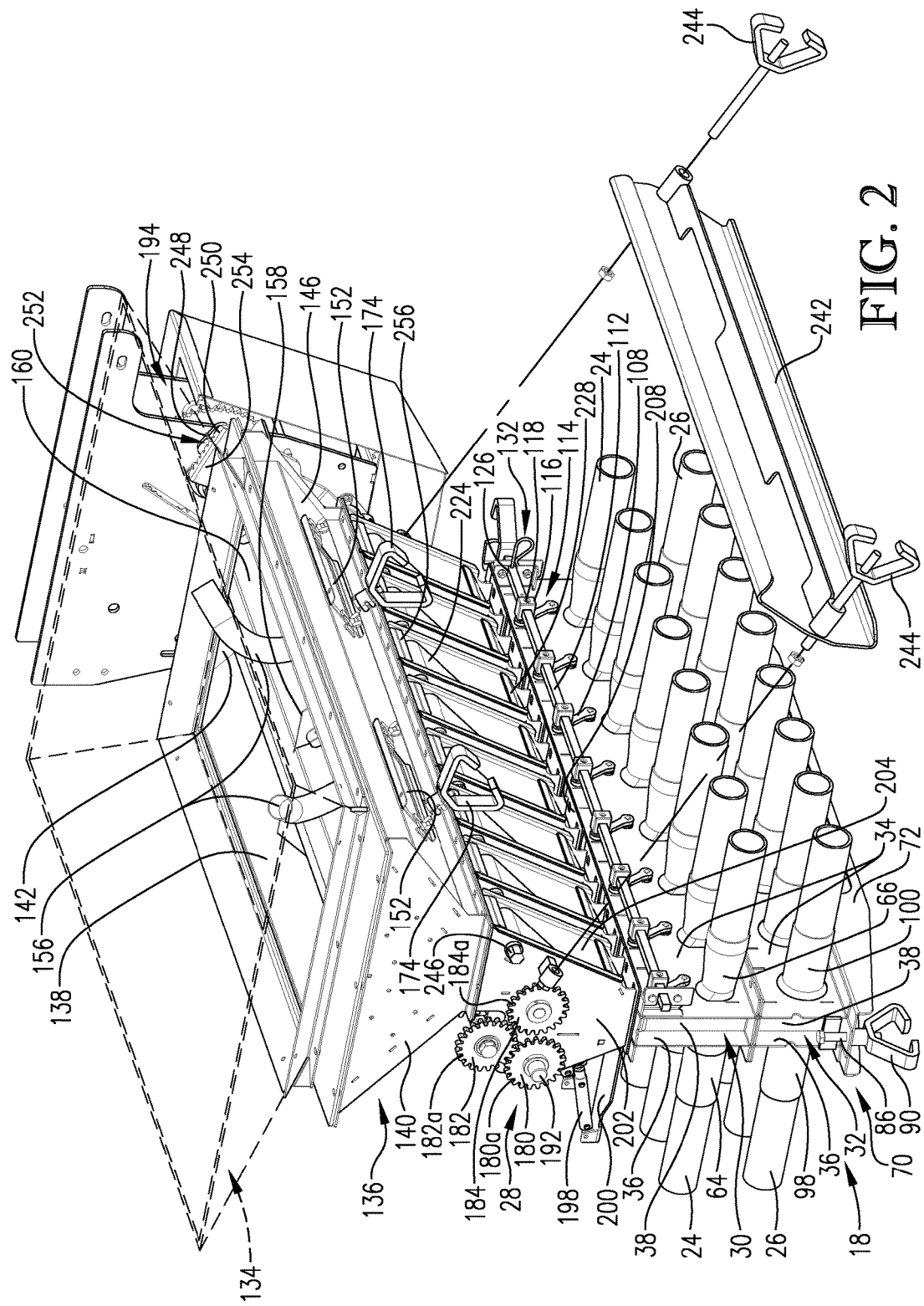
FIG. 2 is an enlarged right front isometric view of a portion of an air seeder similar to that of FIG. 1, particularly illustrating a collector assembly and metering structure below a tank.
Figure 4:
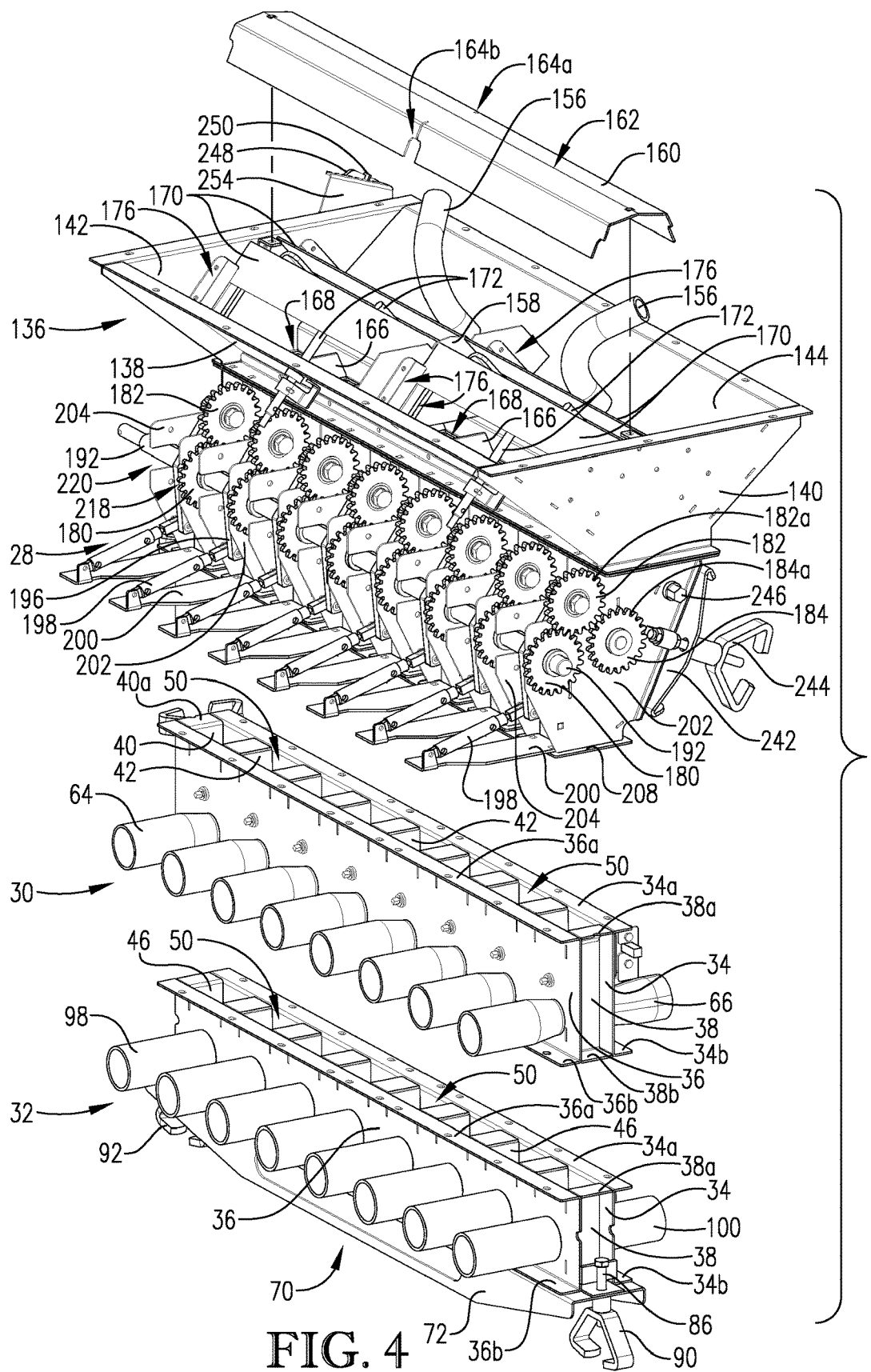
FIG. 4 is an enlarged, exploded right rear isometric view of the portion of the air seeder seen in FIG. 2, sans the transmission system, particularly illustrating the seed flow directing structures of the lower tank, a plurality of metering sections, and a collector assembly.

As shown in FIG. 2 and others, a metering structure 28, which will be described in depth below, is positioned above each collector assembly 18. Each collector assembly 18 comprises a generally hollow body that includes a pair of vertically stacked upper and lower collector modules 30 and 32, respectively. The body of each module 30,32 is generally rectangular and is fabricated from a plurality of plate materials to present a front wall 34, a spaced rear wall 36, and a pair of opposite end walls 38 and 40. Front wall 34 is provided with out-turned flanges 34a and 34b; rear wall 36 is provided with out-turned flanges 36a and 36b; and end walls 38 and 40 are provided with out-turned flanges 38a, 38b and 40a,40b, respectively. As best shown in FIG. 4, all of the aforementioned flanges facilitate bolting of collector modules 30, 32 to one another and to the bottom of the metering structure 28.

Figure 8:
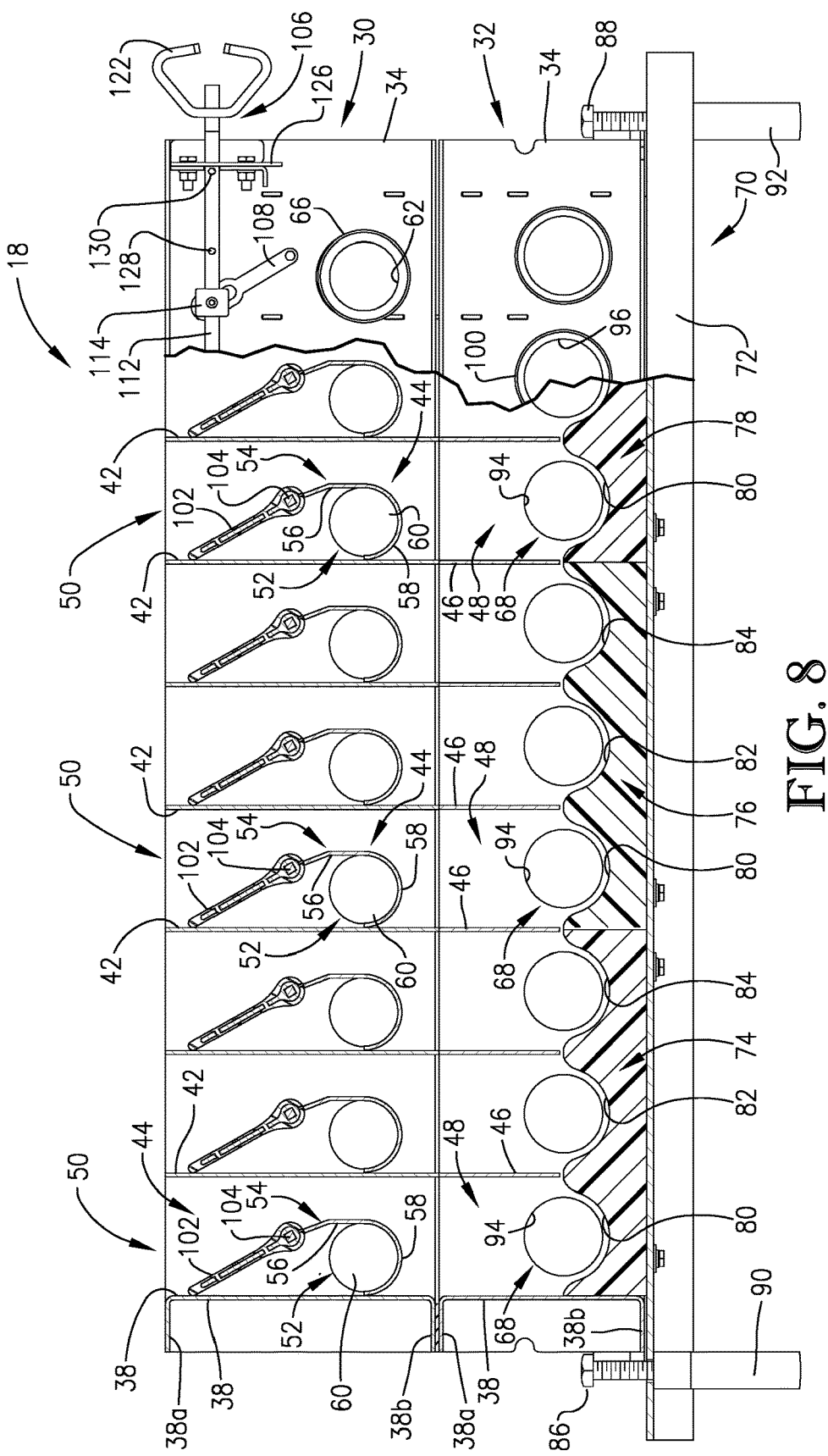
FIG. 8 is a partially sectioned front elevational view of a collector assembly, showing the interior thereof and the diverter valves in a position such that the valves completely close the upper loading zones and open the lower loading zones.
Figure 9:
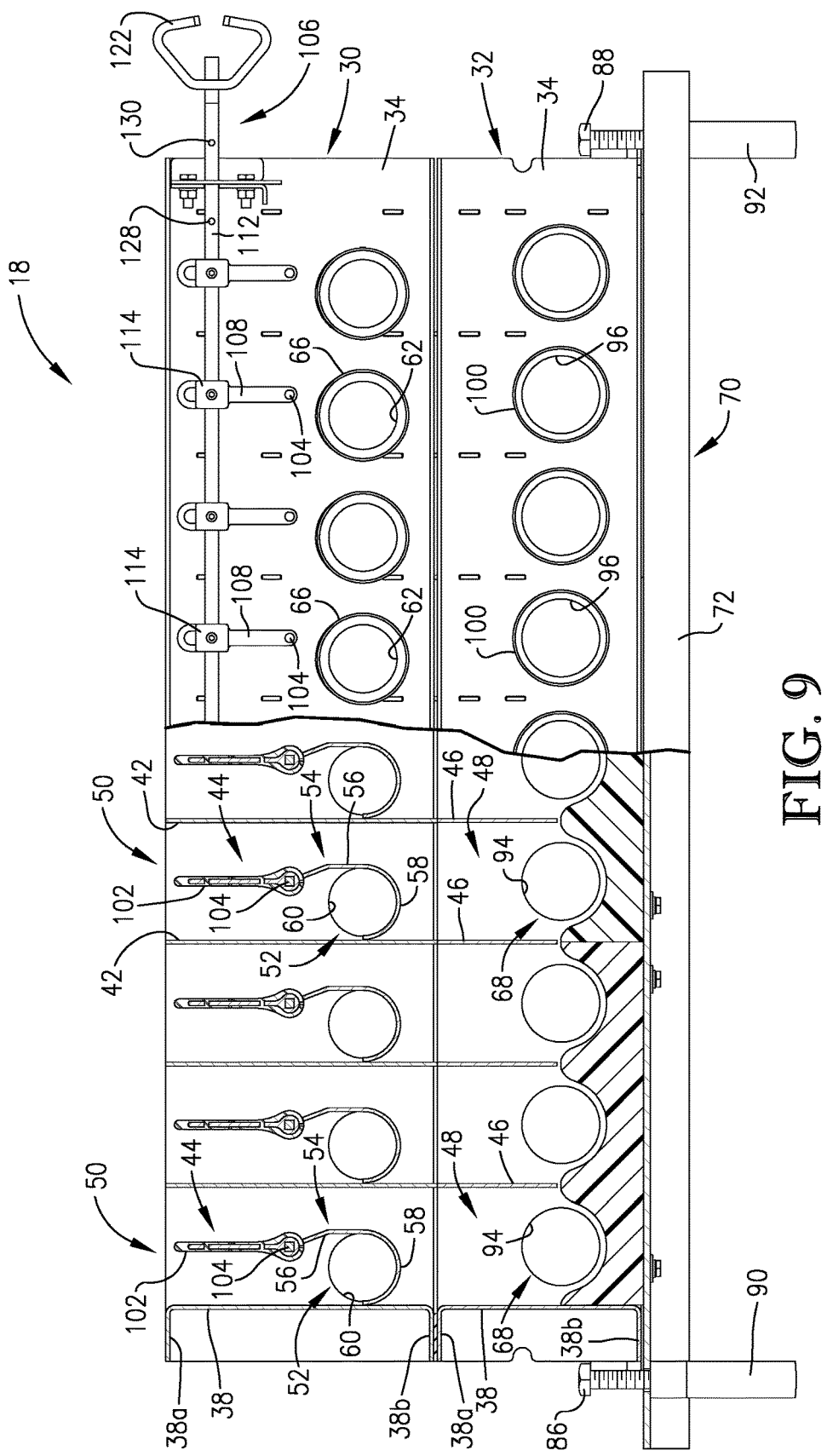
FIG. 9 is a partially sectioned front elevational view of the collector assembly of FIG. 8, showing the interior thereof and the diverter valves in an intermediate position, wherein both upper and lower loading zones are open so that materials from the overhead tank are introduced into both upper and lower air streams passing through the collector assembly.
Figure 10:
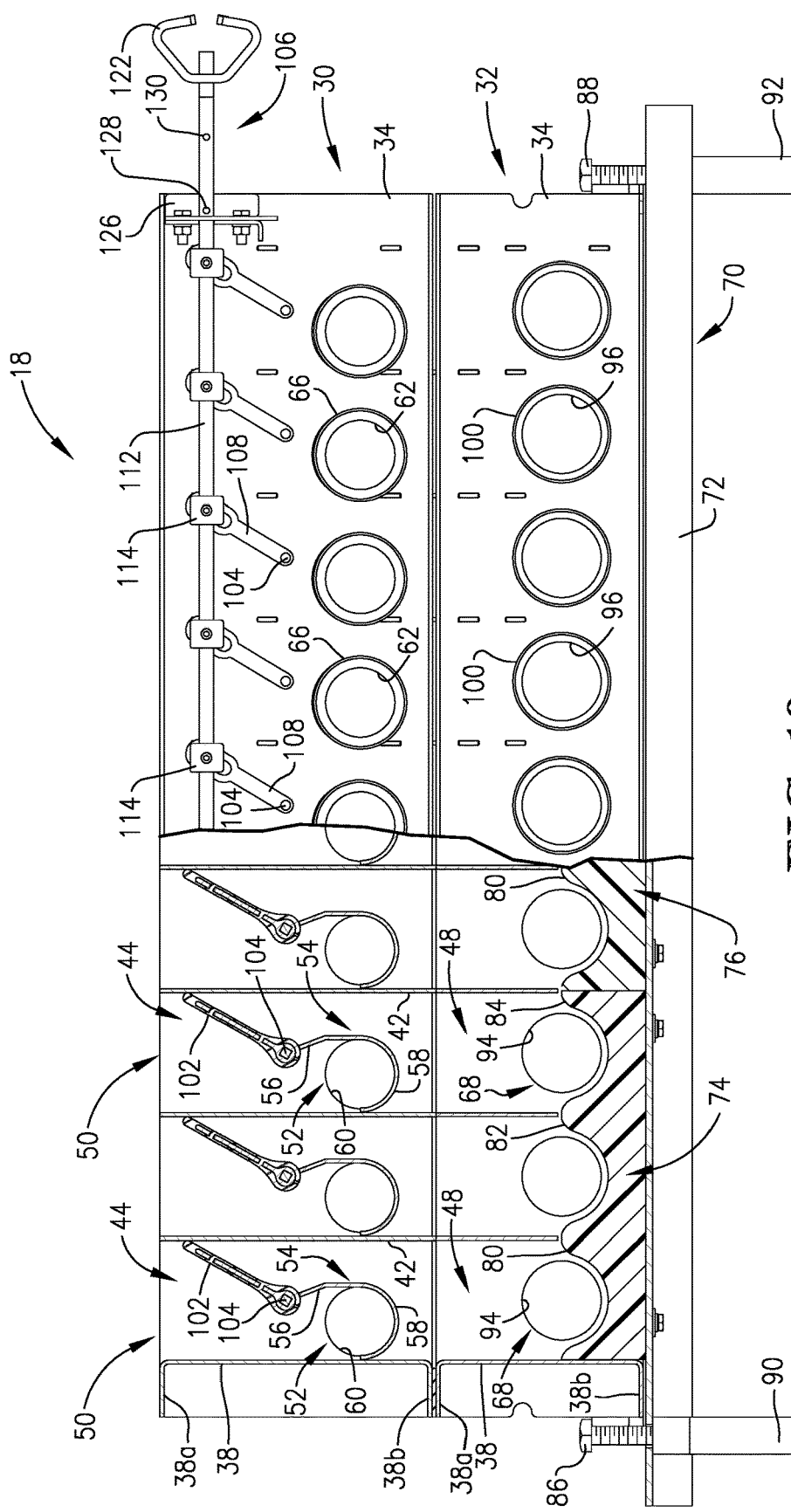
FIG. 10 is a partially sectioned front elevational view of the collector assembly of FIGS. 8 and 9, showing the interior thereof and the diverter valves in a position such that the valves force metered product from the overhead container to drop only into the upper loading zones.

As illustrated in particular in FIGS. 8-10, the interior of upper collector module 30 is subdivided by a plurality of upright, transversely spaced collector partitions 42 extending between front wall 34 and rear wall 36, there being a total of one fewer such partitions 42 than there are upper and lower primary lines 24,26. In FIGS. 8-10, for instance, eight partitions 42 are present; and the collector partitions 42 cooperate with one another and with opposite end walls 38,40 to present nine separate upper compartments 44 across the width of the module 30, with the upper compartments 44 being effectively sealed from one another. Upper compartments 44 directly underlie corresponding outlets of the metering structure 28 so as to receive nine corresponding, discharging streams of material from such structure 28.

In the same nine-line embodiment, lower module 32 has a similar series of eight upright collector partitions 46 that extend between front and rear walls 34,36 thereof and cooperate with end walls 38,40 to define nine discrete lower compartments 48 in lower module 32. The nine upper compartments 44 are in direct overhead registration with the corresponding nine lower compartments 48 so as to effectively define nine generally upright collector passages 50 extending from the upper margin of upper module 30 to the lower margin of lower module 32, each such collector passage 50 having an upper portion defined by the corresponding upper compartment 44 and a lower portion defined by the corresponding lower compartment 48.

Figure 5:
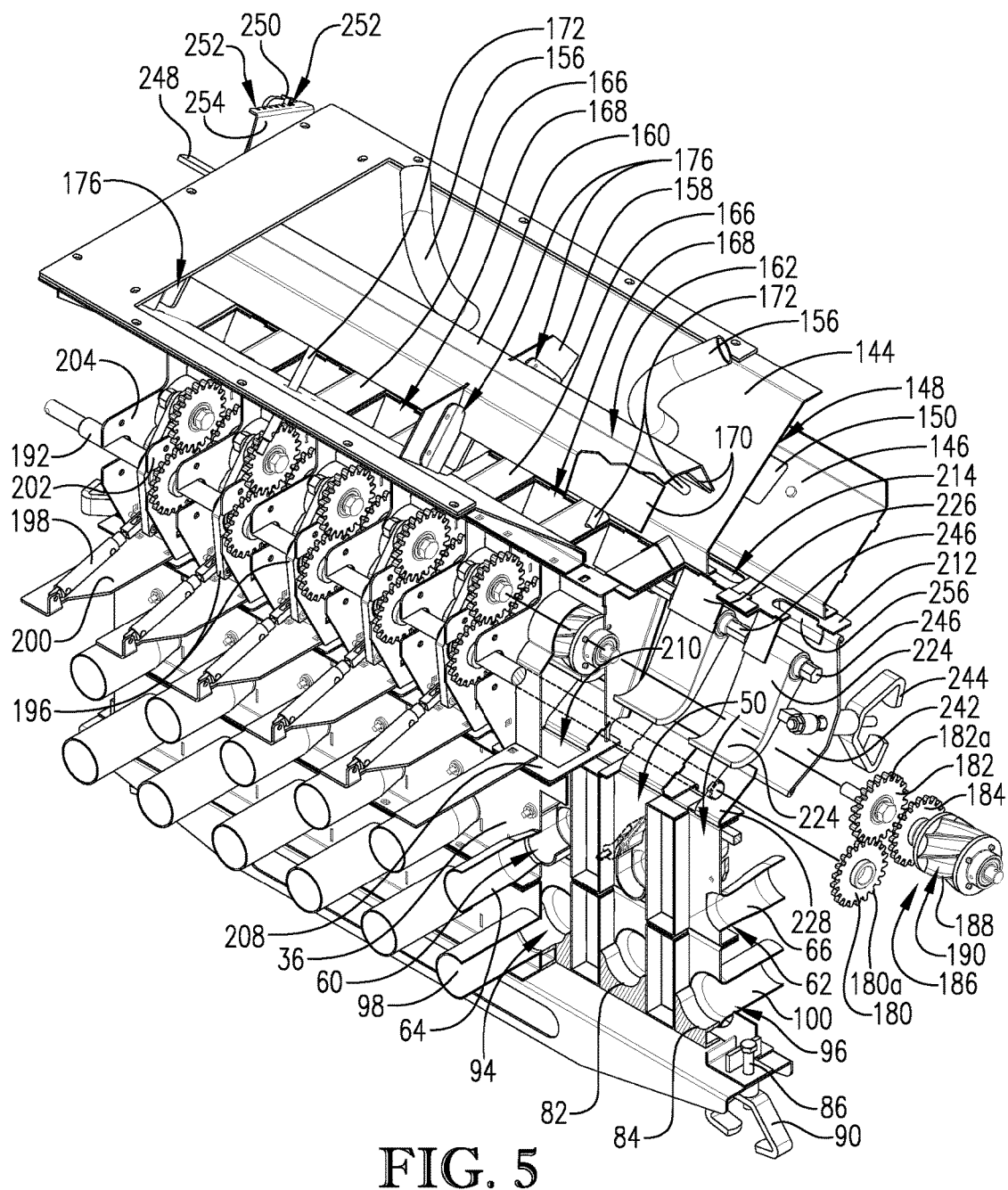
FIG. 5 is an enlarged, partially exploded, partially sectioned right rear isometric view of the portion of the air seeder seen in FIG. 4, particularly illustrating the components of the metering sections.

Regardless of the number of compartments 44,48 that are present, each upper compartment 44 is provided with an upper loading zone 52 formed by a transversely J-shaped cup 54 extending between front wall 34 and rear wall 36 thereof. The generally upright leg 56 of cup 54 is located approximately halfway between adjacent collector partitions 42 and terminates at a distance below the top margin of upper module 30. The concave leg 58 of each cup 54 likewise extends the entire distance between front wall 34 and rear wall 36 and has its distal end welded or otherwise secured to the proximal partition 42 or end wall 38 as the case may be. Concave leg 58 of each loading cup 54 registers with an inlet 60 in rear wall 36 and an outlet 62 in front wall 34. As shown in FIG. 5 and others, a rear tube 64 comprising part of the upper conveying line 24 is secured to back wall 36 in registration with inlet 60, while a front tube 66 is secured to front wall 34 in registered communication with outlet 62. Thus, each upper loading zone 52 is disposed within the path of pressurized air flowing through a corresponding one of the upper primary conveying lines 24.

Each of the upright collector passages 50 is also provided with a lower loading zone 68 located in the corresponding lower compartment 48. In this respect, a floor 70 extends across the entire width of the body of collector assembly 18, and particularly across the bottom of lower module 32. The floor 70 includes a transversely U-shaped, inverted channel 72 having a plurality of cup segments 74,76,78. As illustrated especially in FIG. 8, for instance, three cup segments 74,76,78 may be bolted to the upper surface of the floor 70, each such segment including three separate cups 80,82,84.

The length of the line of cup segments 74, 76, and 78 is such that when floor 70 is fastened to the bottom margin of lower module 32 by bolts 86,88 and wing nuts 90,92, segments 74, 76, and 78 slip up into lower compartments 48 while channel 72 abuts the bottommost of the flanges of end walls 38 and 40. Although three cup segments having three cups apiece is a preferred configuration, it is within the ambit of the present invention for any suitable number of cup segments and cups to be used.

Each lower loading zone 68 is in open communication with a rear inlet 94 in rear wall 36 and a front outlet 96 in front wall 34. A rear tube 98 of the corresponding lower primary line 26 is affixed to rear wall 36 in registered communication with inlet 94, while a front tube 100 of line 26 is affixed to front wall 34 in registered alignment with outlet 96. Each lower loading zone 68 is disposed in the path of travel of the air stream flowing through the corresponding primary line 26 as it passes through lower compartment 48. Such air stream thus passes into, through, and out of the lower loading zone 68.

Each upper compartment 44 of the collector passages 50 contains its own diverter valve 102. Each diverter valve 102 is in the nature of a flapper plate that is substantially the same width in a fore-and-aft direction as the corresponding upper compartment 44. Each valve 102 is fixed to a fore-and-aft rock shaft 104 that is journaled by front and rear walls 34,36 and is located proximal to the uppermost tip of the J-shaped cup 54 of upper loading zone 52.

Each valve 102 is moveable between a position completely covering and thus closing off the upper loading zone 52, as shown in FIG. 8, and an alternative extreme position, shown in FIG. 10, in which the valve is inclined in the opposite direction to close off the lower loading zone 68. More particularly, the FIG. 8 position of valve 102 is such that the lower loading zone 68 is open but the upper loading zone 52 is completely closed. The FIG. 10 position of valve 102 is such that the upper loading zone 52 is open but the lower loading zone 68 is completely closed. FIG. 9 illustrates the valves 102 in an intermediate position, wherein both the upper loading zones 52 and the lower zones 68 are open.

In order to actuate the diverter valves 102 between their various positions, actuating mechanism broadly denoted by the numeral 106 is provided. In one preferred form of the invention, actuating mechanism 106 is designed to operate all of the diverter valves 102 simultaneously. More specifically, actuating mechanism 106 includes an operating lever 108 for each valve 102, such lever 108 being affixed to an outer end of rocker shaft 104 where it projects forwardly beyond front wall 34. Each lever 108, in turn, has an elongated slot 110 at its distal end remote from the point of connection of lever 108 to rock shaft 104.

Mechanism 106 further includes a single push-pull rod 112 that extends across the front of the upper collector module 30 adjacent its upper margin. Further, mechanism 106 includes a series of couplings 114 secured to rod 112 at spaced locations along the length thereof. The couplings 114 connect the rod 112 with the operating levers 108. Each coupling 114 comprises a block 116 that is slidably adjustably positionable along the length of rod 112 and is secured in a selected position by a set screw 118. Further, each coupling 114 includes a pin 120 (see FIG. 6) projecting rearwardly from block 116 into the slot 110 of the corresponding actuating lever 108. Thus, as rod 112 is pushed or pulled along its length, such motion is transmitted to operating levers 108, and the arcuate motion of levers 108 relative to the straight line reciprocal motion of rod 112 is accommodated by virtue of the coupling pins 120 moving between opposite ends of slots 110 in levers 108. A handle 122 at one end of rod 112 facilitates manipulation thereof.

Figure 7:
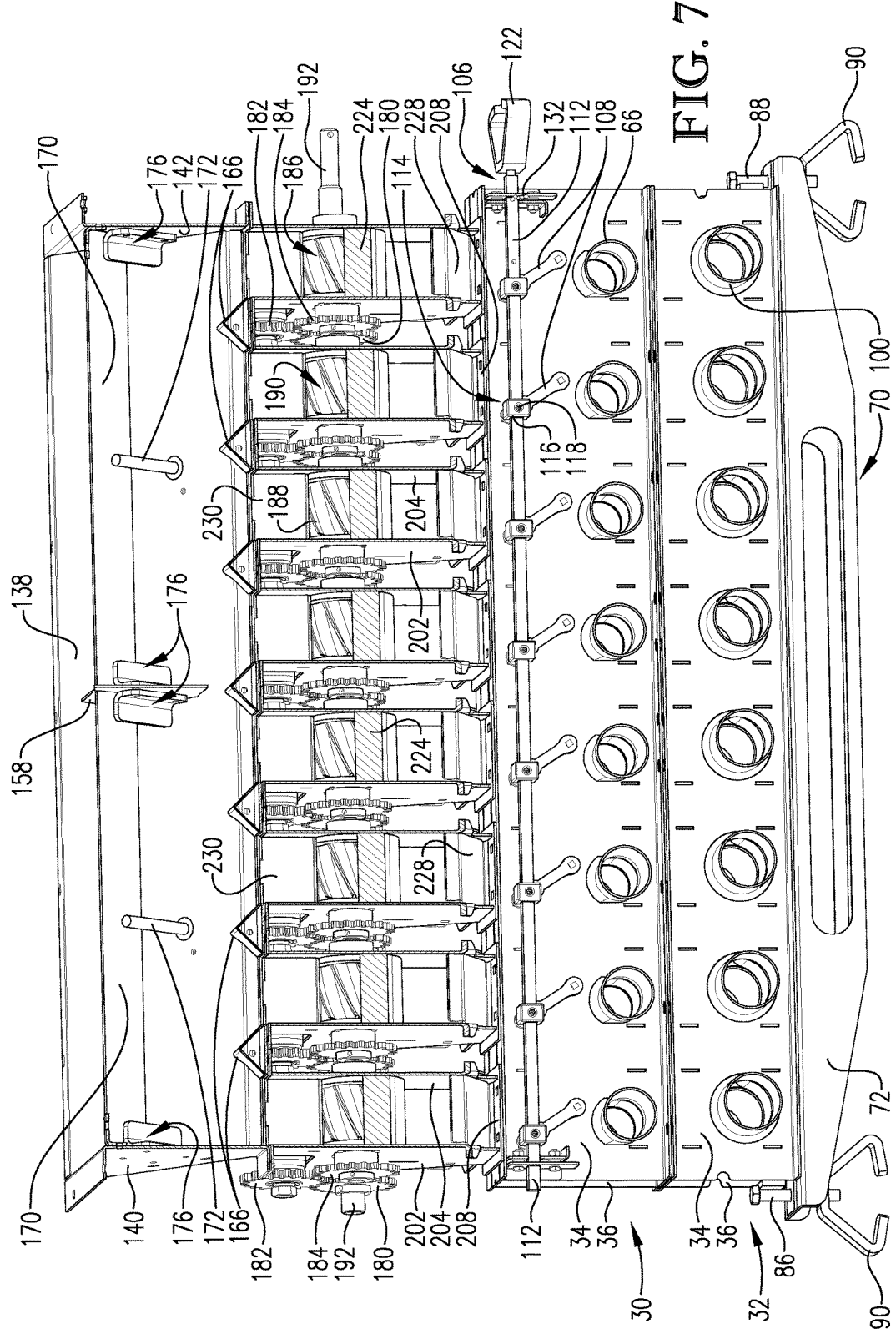
FIG. 7 is an enlarged right front isometric view of the portion of the air seeder seen in FIG. 4, particularly illustrating the components of the metering sections.

A pair of guide brackets 124 and 126 are secured to front wall 34 of upper collector module 30 adjacent opposite lateral ends thereof and reciprocally support the push-pull rod 112. Rod 112 has a pair of cross-holes 128 and 130 therein, positioned generally adjacent handle 122 and adapted to removably receive a cotter pin 132. Holes 128 and 130 are so located that when rod 112 has diverter valves 102 positioned as in FIG. 8, holes 128 and 130 are both located to the left side of guide bracket 126. Thus, as shown in FIG. 7 (which illustrates the same diverter valve 102 position as FIG. 8), the cotter pin 132 may be inserted into hole 130 at such time to bear against the inboard surface of guide bracket 126 and prevent rod 112 from being shifted axially to the right (directions here being from the perspective of one viewing the cited figures), which would shift the diverter valves 102 away from their positions covering the upper loading zone 52. By removing cotter pin 132, rod 112 can be shifted rightwardly from the position of FIGS. 7 and 8 until the diverter valves 102 are brought to their positions for covering lower loading zone 68, as illustrated in FIG. 10. Cotter pin 132 may then be inserted into hole 128, which is now located on the outboard side of guide bracket 126, thus locking rod 112 against leftward movement and thereby retaining diverter valves 102 in the appropriate position for covering the lower loading zone 68.

As illustrated in FIG. 9, when cotter pin 132 is completely removed from rod 112, rod 112 may be positioned in an intermediate position, wherein diverter valves 102 open both upper and lower loading zones 52 and 68. Additional holes in rod 112 could be provided to receive cotter pins or the like on opposite sides of guide bracket 126 to hold diverter valves 102 in such intermediate position, if desired. Alternatively, other means could be provided for releasably locking rod 112 and diverter valves 102 in such intermediate position.

During operation, air streams from lines 24 and 26 are constantly passing through the body of each collector assembly 18. Thus, in the illustrated embodiment, all of the upper loading zones 52 and all of the lower loading zones 68 are always exposed to conveying streams of air. If it is desired for product from a selected one of the overhead tanks 12,14,16 to be metered into only the lower primary lines 26, the respective push-pull rod 112 is set in the position of FIGS. 7 and 8 so as to cause all of the diverter valves 102 associated with the selected tank 12, 14, or 16 to close the respective upper loading zones 52 and open the respective lower loading zones 68. Thus, product gravitating through collector passages 50 lands on the diverter valves 102 and is directed away from upper loading zones 52 into lower compartment 48 and lower loading zones 68. Upon entering the lower loading zones 68, the product is immediately entrained in the air streams passing through loading zones 68 and conveyed downstream through lower primary lines 26. If the air streams coming into lower loading zones 68 have already been loaded with materials from an upstream tank, the products gravitating through the collector assembly simply join with the existing materials and travel together through lower primary lines 26 to their ultimate destinations.

On the other hand, if the operator desires to have products from a selected one of the overhead tanks 12,14,16 enter only into the upper primary lines 24, the respective push-pull rod 112 is positioned as shown in FIG. 10 to cause all of the diverter valves 102 associated with the selected tank 12, 14, or 16 to close their respective lower loading zones 68 and open their respective upper loading zones 52. Thus, product metered from the selected tank 12, 14, or 16 gravitates into the collector passages 50 and is directed by the diverter valves 102 directly into upper loading zones 52, where the transversely moving streams of air entrain the materials and carry them downstream in upper lines 24. If product from an upstream tank has already been introduced into lower primary lines 26, such product merely passes through lower loading zones 68 and continues to travel within lower lines 26 without being combined in any way with the product introduced into upper lines 24 at the upper loading zones 52.

If, for any reason, the operator prefers to have product from a selected one of the overhead tanks 12,14,16 entering both upper lines 24 and lower lines 26, the respective push-pull rod 112 is positioned in the intermediate position of FIG. 9, wherein diverter valves 102 associated with the selected tank 12, 14, or 16 are positioned to open the respective upper loading zones 52 as well as the respective lower loading zones 68 at the same time. Different degrees of openness of the upper and lower loading zones can also be achieved by positioning control rod 112 at any selected one of a number of positions to correspondingly vary the relative amounts of product to flowing into zones 52 and 68.

It will thus be seen that the collector assembly 18 of the present invention provides a great deal of flexibility and convenience for the farmer. Various combinations of tanks and supply lines can be used to best suit the farmer's particular needs at any given time. For example, the cart 10 shown in FIG. 1 has three tanks 12, 14, and 16, each of which is provided with its own collector assembly 18. In one exemplary use of this construction, rear tank 12 may be filled with fertilizer, center tank 14 may contain seeds, and front tank 16 may contain additional fertilizer or an inoculant. In a preferred particulate diversion arrangement, the collector assembly 18 associated with rear tank 12 may then be set so that all materials from tank 12 bypass the upper loading zones 52 and drop into lower loading zones 68 for pickup by the lower primary lines 26. The collector assembly 18 of middle tank 14 may be set to close its lower loading zones 68 so that all materials from tank 14 are diverted into only the upper zones 52, where they are picked up by the air streams within upper primary lines 24. Thus, fertilizer from rear tank 12 and seeds from middle tank 14 are maintained separate from one another. Meanwhile, the collector assembly for the front tank 16 may be set to drop product into either or both of the primary lines 24 and 26 as may be desired, depending upon the nature of the products within the front tank 16.

In other situations it may be desirable, for example, to use all three tanks 12,14,16 for the same product. All three tanks 12,14,16 may be filled with seeds, for example. By first cleaning out the tanks 12,14,16 completely (the means by which this can be efficiently accomplished being described hereinbelow), tanks that have previously been used for fertilizer may now be used for seeds, and vice versa.

In a preferred embodiment, each of the tanks 12, 14, and 16 includes a storage portion 134 and an outlet portion 136 that is positioned below the storage portion 134 and coupled thereto. The outlet portion 136 is in vertical alignment with the respective metering structure 28. The outlet portion 136 preferably includes a rear wall 138, a pair of side walls 140 and 142, an inner front wall 144, and an outer front wall 146.

The inner and outer front walls 144 and 146, respectively, are spaced from each other so as to form a channel 148 therebetween. A pair of openings or windows 150 are formed in the outer front wall 146 such that the windows 150 are in communication with the channel 148. A removable window cover 152 is provided for covering each window 150. The inner front wall 144 includes a pair of openings 154 that are also in communication with the channel 148. A tube or hose 156 extends into the interior of the respective tank 12, 14, or 16 from each of the openings 154 such that each tube 156 is in communication with the channel 148 at one end and with the interior of the tank 12, 14, or 16 at the other end. The channel 148 is in communication at its lower end with the respective metering structure 28, as will be discussed in more detail hereinbelow. The aforementioned structures thus form a pressure equalization system that ensures that the internal pressure in the given tank 12, 14, or 16 is the same as that in the metering structure 28. Such balancing of pressure helps prevent hang-up or "bridging" of the particulate within the metering structure 28.

Preferably, each outlet portion 136 includes a variety of structures designed for direction of and control of the particulate material contained in the respective tank 12,14, or 16. For instance, each outlet portion 136 preferably includes a divider 158 that extends in a fore-and-aft direction to bisect the outlet portion 136. However, multiple dividers or none at all could be used.

Figure 6:
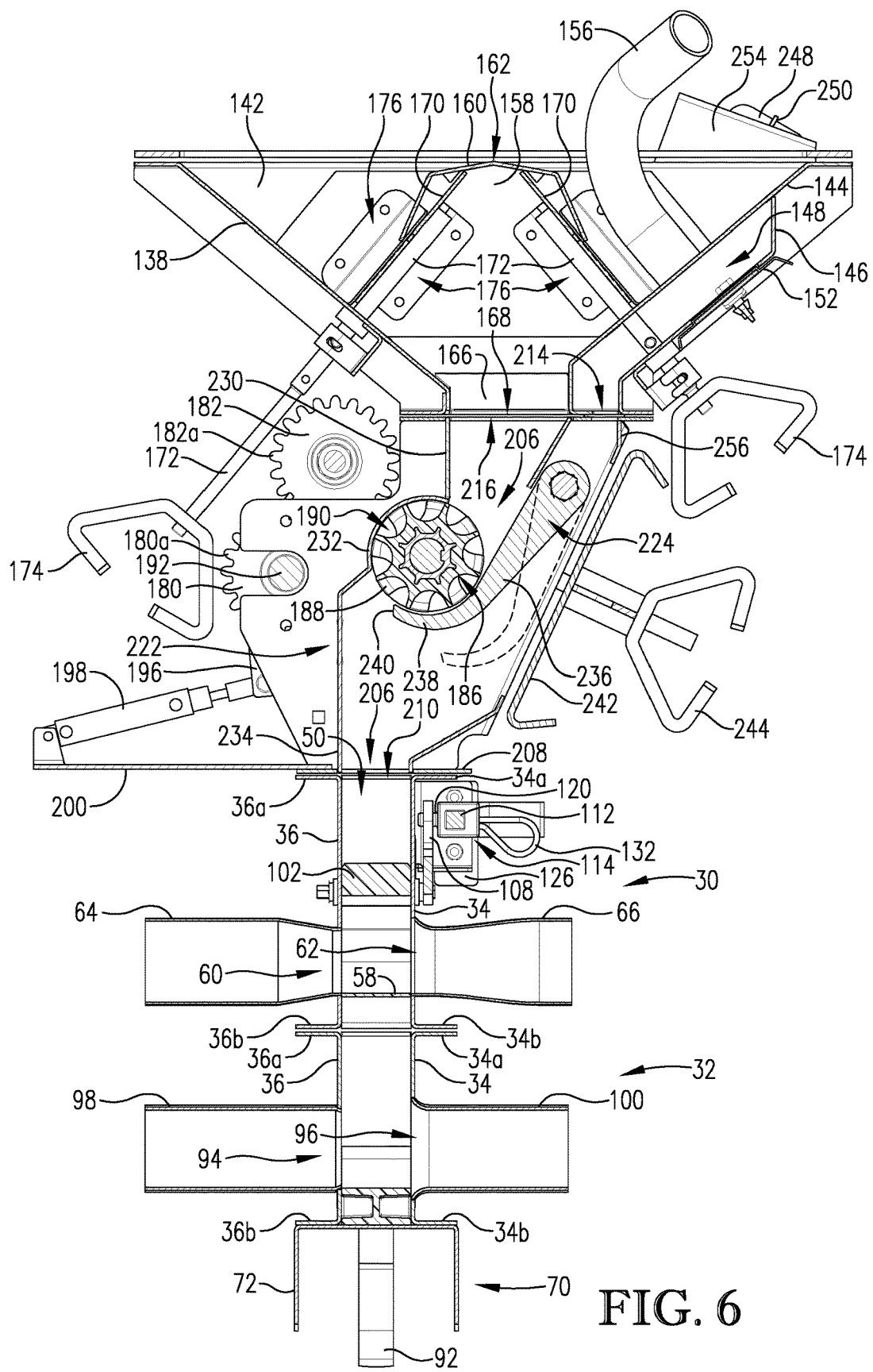
FIG. 6 is a vertical cross-sectional view of the right side of the portion of the air seeder seen in FIG. 4.

As best shown in FIGS. 4-6, in a preferred embodiment, the outlet portion 136 also includes a roof 160 having a peak 162. Seed or other particulate material entering the outlet portion 136 from the storage portion 134 is diverted into either the fore or aft portion of the outlet portion 136 by the roof 160. A pair of irregular slits 164a,164b are formed in the roof 160. Each of the slits 164a,164b is such that a portion of the divider 158 projects therethrough.

As best shown in FIG. 7, a plurality of triangular diverters 166 are preferably provided at the base of the outlet portion 136. Each triangular diverter 166 further diverts the seed or particulate material, albeit in one lateral direction or another rather than fore or aft as for the roof 160. The material then exits the outlet portion 136 via one of a plurality of outlets 168.

In a preferred embodiment, a plurality of sliders 170 are provided in each outlet portion 136. The sliders 170 are operable to slide toward and away from the center of the outlet portion 136 prior to fixation in a selected position. In the illustrated embodiment, such sliding is initiated via manual adjustment of rods 172, each of which can be fixed via wing nuts 174 to ensure the respective slider 170 is held stationary when desired. A plurality of end supports 176 are provided to support the ends of the sliders 170 and to guide the respective slider 170 in a linear direction when the slider 170 is in motion. In a preferred embodiment, a pair of end supports 176 is provided on each of the side walls 140,142. A pair of end supports 176 is also provided on each side of the divider 158.

The sliders 170 are positioned such that the roof 160 is positioned above and overhangs the sliders 170. In addition to diverting the product, as described above, the roof 160 also ensures that the product does not fall between the sliders 170.

The sliders 170 are operable to shut off dispensation of particulate material to selected portions of the metering structure 28 or to the metering structure 28 in its entirety. More particularly, when one of the rods 172 is pulled outward relative to the outlet portion 136, the respective slider 170 moves from the position shown in FIGS. 2-7, in which the associated outlets 168 are unobstructed, to one (not shown) in which the slider 170 covers each of the associated outlets 168. Only material having already entered the portion of the metering structure 28 associated with the given slider 170 prior to its closure will then be available for dispensation, and no additional material from the tanks 12,14,16 will be allowed to enter the respective portion of the metering structure 28. The latter effect is particularly advantageous when, for instance, maintenance or repair is required for components of the metering structure 28, as one or more of the sliders 170 can be positioned to block particulate from entering the metering structure 28 or a portion thereof while work is being done.

Although the sliders 170 may be positioned to leave the outlets 168 fully uncovered or fully covered, intermediate positions are possible, as well. Furthermore, each of the sliders 170 may be positioned differently from the other sliders 170.

The use of few sliders 170, as shown in the illustrated embodiment, allows for easy isolation of large portions of the metering structure 28 or of the metering structure 28 in its entirety for convenient maintenance and repair access. However, it is noted that any number of sliders or no sliders at all may be present without departing from the spirit of the present invention.

The illustrated metering structure 28 includes suitable metering mechanisms for either discharging materials at a metered rate of flow from the tanks 12, 14, and 16 into the respective collector assemblies 18 or preventing their discharge into the respective collector assemblies 18. More particularly, metering structure 28 includes a plurality of metering sections 178 (one of which is shown in isolation in FIGS. 11-13), each of which includes, among other things, a rotatable drive wheel 180 having teeth 180a, a rotatable engagement wheel 182 having teeth 182a, and a rotatable metering wheel 184 having teeth 184a. A metering roller 186 is connected to rotate with the metering wheel 184. Preferably, the metering roller 186 includes a plurality of flutes 188, which are arranged in a helical pattern and are configured to define a plurality of particulate-receiving pockets 190 therebetween. However, a variety of roller configurations are permissible. For instance, the flutes could be arranged in a herringbone or other type of pattern, or a non-fluted roller could be used. Furthermore, with respect to certain aspects of the invention, the metering structure could alternatively be configured to vary the rate of particulate dispensation rather than just providing "on" and "off" configurations.

In the illustrated embodiment, each of the drive wheels 180 is mounted on a common drive shaft 192 to rotate therewith. However, it is within the ambit of the present invention for multiple drive shafts to be used, provided that appropriate drive mechanisms are present.

Figure 3:
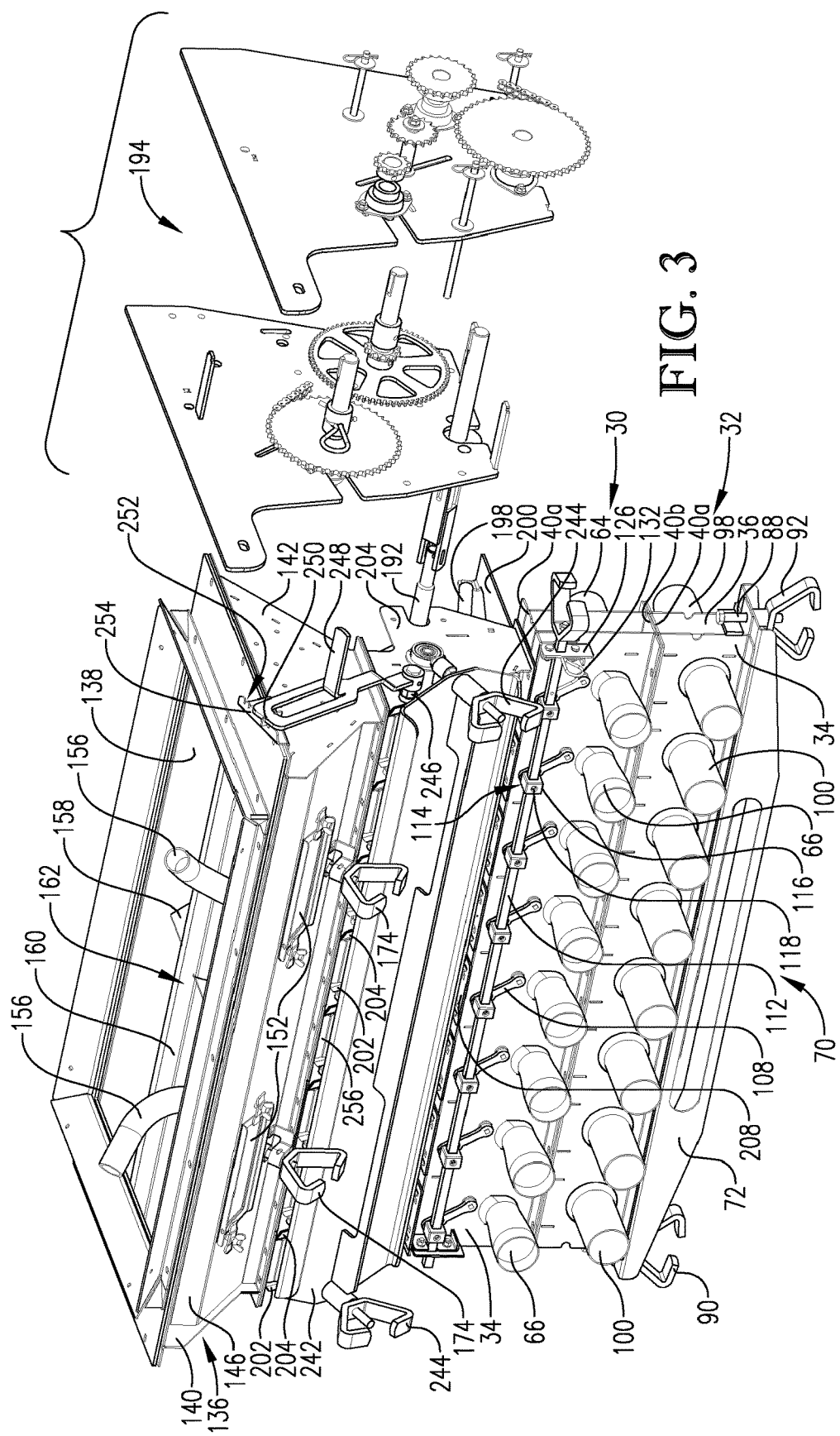
FIG. 3 is an enlarged left front isometric view of the portion of the air seeder seen in FIG. 2, particularly illustrating the transmission system for the metering structure and the mechanism for adjusting the position of the seed plates.

In a preferred embodiment, the rate of rotation of the drive shaft 192 is controlled by a transmission system 194, as shown in FIGS. 2 and 3. A variety of transmission systems known in the art are suitable for implementation with the inventive seeder without departing from the spirit of the present invention. For instance, a positive ground drive transmission having dual- or multi-speed options might be implemented, or a variable drive transmission could be provided. Regardless of the exact implementation, the ability to vary the rotational speed of the drive shaft 192 is desirable, since such rotational speed control allows the metering rate to be independent of tire rotational speed and to therefore be optimized for a variety of particulate materials. For instance, a slow speed may be desirable when seeding fine seeds such as canola or mustard, whereas larger seeds may suitably be dispensed at a higher rotational speed. In other instances, metering rate variations might be desirable based on the soil conditions in a particular location within a field.

Figure 12:
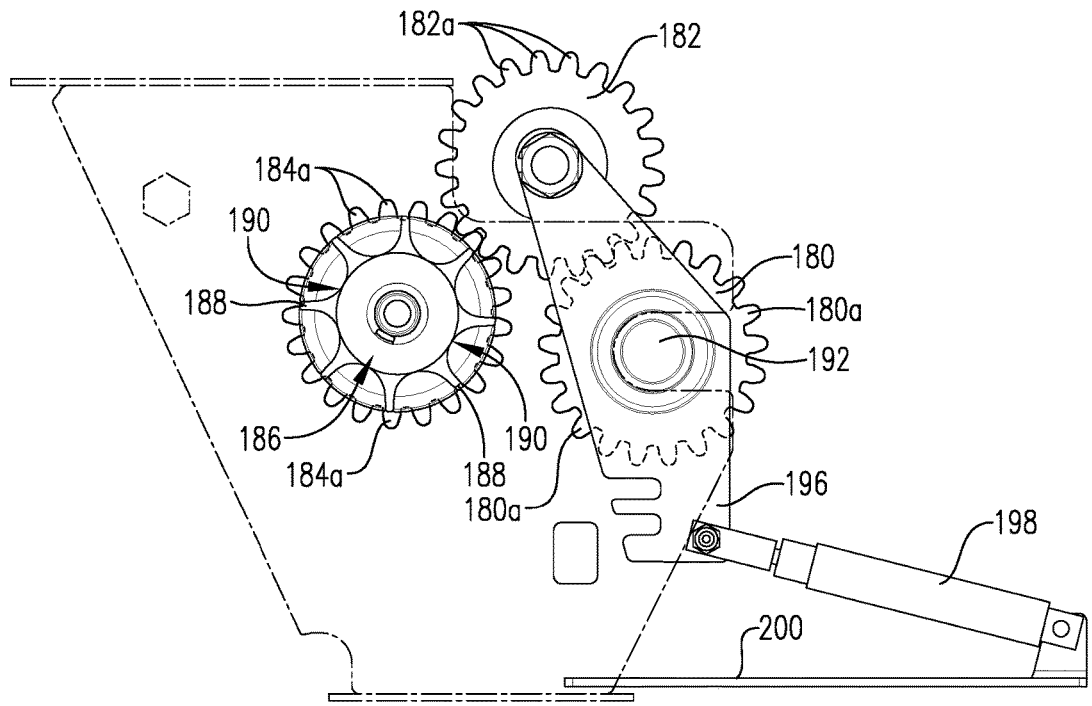
FIG. 12 is a vertical cross-sectional view of the left side of the metering section of FIG. 11 in an engaged configuration.
Figure 13:
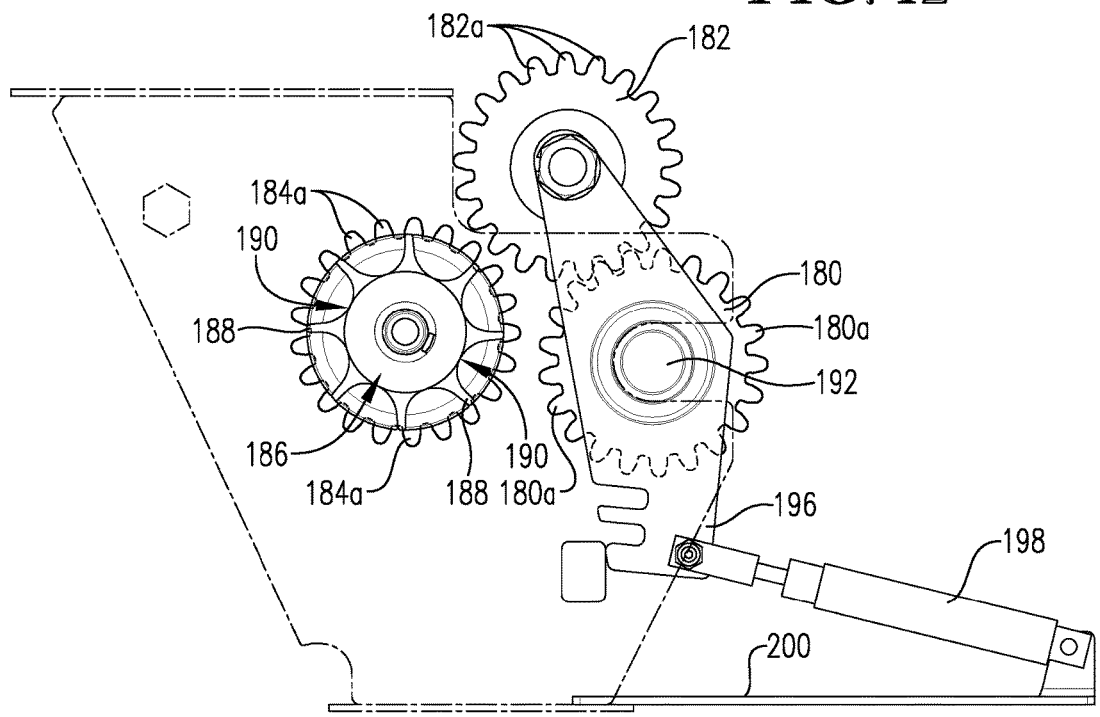
FIG. 13 is a vertical cross-sectional view of the left side of the metering section of FIGS. 11 and 12 in a disengaged configuration.

Each metering section 178 also includes a control arm 196 pivotally mounted relative to the drive shaft 192 for swinging movement about a pivot axis that is aligned with the drive shaft 192. The engagement wheel 182 is rotatably mounted on the upper end of the control arm 196 in such a manner that the teeth 182a of the engagement wheel 182 are maintained in intermeshed engagement with the teeth 180a of the drive wheel 180. Rotation of the drive wheel 180 is thus transmitted to the engagement wheel 182. A hydraulic cylinder 198 is mounted at one of its ends to a cantilevered arm 200 and is connected to the lower end of the control arm 196 at the other of its ends. As best shown in FIG. 12, when the hydraulic cylinder 198 is retracted, the upper end of the control arm 196 pivots forward such that the engagement wheel 182 mounted thereon is operable to drivingly engage the metering wheel 184 by means of the intermeshing of teeth 182a of the engagement wheel 182 with teeth 184a of the metering wheel 184, to thereby cause the metering wheel 184 and, in turn, the metering roller 186, to rotate. As best shown in FIG. 13, however, when the hydraulic cylinder 198 is extended, the upper end of the control arm pivots backward such that the engagement wheel 182 mounted thereon is not operable to drivingly engage the metering wheel 184. That is, the teeth 182a do not intermesh with the teeth 184a. Rotation of the metering wheel 184 and, in turn, the metering roller 186, will thereby either cease or fail to be initiated. Seed or particulate material dispensation can therefore quickly and selectively be initiated or stopped for each individual metering section 178.

The above-described metering configuration is highly advantageous, providing near-instantaneous stoppage of seed dispensation. In a system that attempts stoppage using a moveable gate above a metering roller, for instance, the quantity of seed having already passed by the gate en route to the roller will still be dispensed after the gate has been closed. By contrast, the inventive configuration described herein stops the dispensation directly at the roller. Therefore, the only particulate dispensation that will occur after disengagement of the engagement wheel and metering wheel is that due to continued inertial rotation of the metering roller (which is minimal because of the frictional engagement between the roller, particulate, and surrounding structure). Stoppage of dispensation is therefore nearly instantaneous.

Although hydraulic cylinders are used in the preferred embodiment for actuation of the control arms 196, it is noted that a variety of actuation means fall within the scope of the present invention. For instance, pneumatic or spring-based actuation systems might be used. Furthermore, a single actuator could act on more than one metering section or on all of the metering sections simultaneously. Ultimately, however, a quick-acting actuating system is desirable.

It is further noted that a mechanism other than a pivoting control arm could be used to enable engagement and disengagement of the engagement and metering wheels. For instance, means could be provided for non-pivoting fore-and-aft shifting of the engagement wheel or, if the teeth were configured appropriately, the engagement wheel could swing laterally toward and away from the metering wheel.

Each metering section 178 also includes a pair of vertical metering partitions 202,204 that form the sides of an upright metering passage 206. The metering partitions 202,204 correspond to and are arranged in vertical alignment with the end walls 38,40 and the collector partitions 42 found in the collector assembly 18, such that the upright collector passages 50 and the upright metering passages 206 are in vertical alignment with each other. More particularly, each metering section 178 includes a base plate 208 having an opening 210 and a top plate 212 having an opening 214 and an opening 216. Whereas the opening 210 connects the metering passage 206 with a respective collector passage 50, the opening 214 connects the metering structure with the channel 148 so as to allow for pressure equalization between the metering structure 28 and the respective tank 12, 14, or 16. The opening 216 is in communication with a respective one of the outlets 168 of the outlet portion 136 of the respective tank 12, 14, or 16.

The wheels 180,182,184 of each metering section 178 are positioned adjacent the metering partition 202 on the side of the partition 202 that faces away from the metering partition 204. The metering roller 186 is positioned on the other side of the metering partition 202, such that it is positioned laterally between metering partitions 202,204 or, in other words, within the upright metering passage 206. Slots 218 and 220 are formed in metering partitions 202 and 204, respectively, to allow the drive shaft 192 to pass therethrough.

Figure 11:
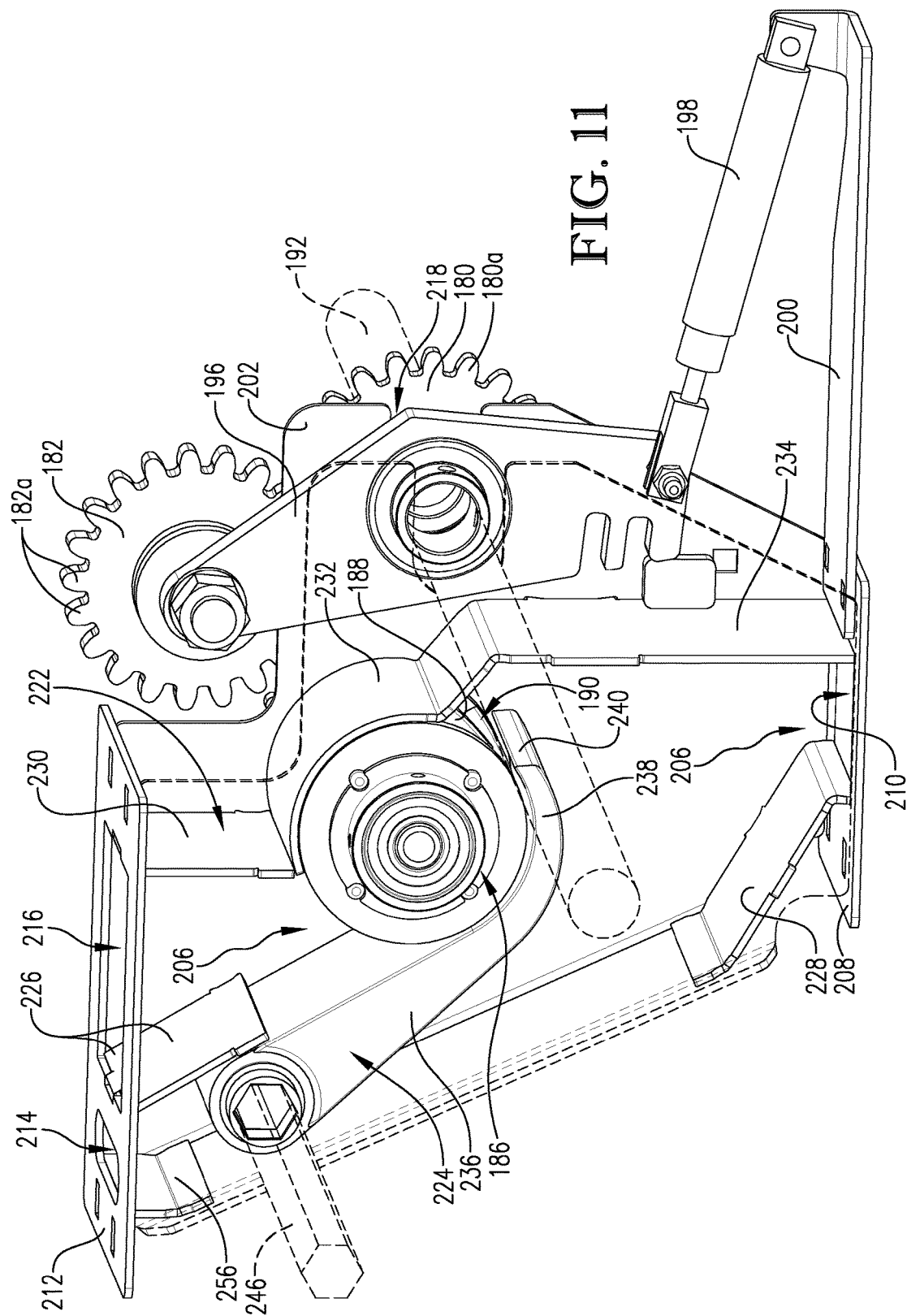
FIG. 11 is a left rear isometric view of a metering section in a disengaged configuration.

As best shown in FIG. 11, a variety of particulate guidance structures are provided to define the upright metering passage 206 or to influence the flow of particulate material therethrough. More particularly, a shield 222, a seed plate 224, an inlet guide 226, and an outlet guide 228 are provided. The shield 222 includes an upper portion 230, a curved middle portion 232, and a lower portion 234. The seed plate 224 includes an arm region 236 and a lip region 238, with the lip region 238 having an end 240. Particulate material that enters the metering section 78 through the opening 216 is guided toward the metering roller by the inlet guide 226, the arm region 236 of the seed plate 224, and the upper portion 230 of the shield 222. The particulate material is then trapped in the pockets 190 of the metering roller 186, such that the material is transported by the metering roller 186 as it rotates in a counter-clockwise direction as viewed in FIG. 11. When the end 240 is reached, however, the material falls downward under the influence of gravity toward and out of the opening 210 in the base plate 208. The material is guided toward the opening 210 by the lower portion 234 of the shield 222, as well as by the outlet guide 228. Any particulate material that does not fall from the pockets 190 travels past the end 140 until it is enclosed in the pockets 190 by the curved middle portion 232 of the shield 222. The middle portion 232 and the upper portion 230 thus ensure that particulate material is not lost out of the back of the respective metering section 178.

Each metering section 178 also shares a removable front wall 242, best shown in FIGS. 2 and 3, that can be attached or removed via wing nuts 244. When attached for operation, the front wall 242 ensures that particulate material is not lost out of the front of any of the metering sections 178.

Removal of the front wall 242 provides convenient access to the critical components of each metering section 178. Although a single shared front wall 242 is preferred, multiple front walls could be provided, with one wall corresponding to several metering sections 178 or with each metering section 178 including its own front wall.

In a preferred embodiment, each of the seed plates 224 is mounted on a shared shaft 246, best shown in FIG. 5, that traverses the upright metering passages 206. As shown in FIG. 3, the shaft 246 is connected at one end to a handle 248. The handle 248 includes a projection 250 that is designed to fit into one of a plurality of slots 252 in a positioning guide 254. Movement of the handle 248 and, in turn, shifting of the projection 250 from one of the slots 252 to another of the slots 252 results in pivoting of the plurality of seed plates 224 from one position to another. Thus, the seed plates 224 may be positioned in a range of configurations, from very close proximity to the metering rollers 186, as shown by the solid line in FIG. 6, to a substantial distance from the metering rollers 186, as shown by the dashed line in FIG. 6. Such positional control of the seed plates 224 provides the operator with the ability to further customize the metering process to various particulate sizes.

It is noted that a variety of seed plate designs fall within the scope of the present invention. In addition to basic shape variations, for instance, modified seed plates might include ridges for additional seed guidance, with the spacing and configuration of the ridges varying according to the seed type.

In a preferred embodiment, each of the metering sections 178 also includes an airflow diverter 256. As best shown in FIGS. 5 and 6, the diverter 256 acts in cooperation with the outer front wall 146 to define a path of travel for air moving between the channel 148 and the respective metering section 178 as part of the pressure-equalization system described previously.

In a preferred embodiment, means are provided for complete and rapid emptying of the contents of the tanks 12, 14, and 16 into the collector assemblies 18. Under normal operation, as described above, each metering structure 28 receives particulate materials gravitating from the respective tank 12, 14, or 16 through respective outlets 168 thereof. The metering rollers 186 then selectively allow or prevent particulate dispensation into a respective collector assembly 18 to proceed. However, such rollers 186 can be intentionally bypassed if and when the operator wishes to completely and rapidly empty the contents from the tank so that they pass directly into the respective collector assemblies 18 instead of being metered slowly or not at all by the metering rollers 186. More particularly, when the seed plates 224 are positioned as shown by the dashed line in FIG. 6, seed entering the metering sections 178 may completely bypass the respective metering rollers 186 and thereby travel from the respective tank 12, 14, or 16 to the respective collector assembly 18 with little or no resistance.

Furthermore, the present design of each collector assembly 18 is conducive to rapid, complete, and easy dumping of the contents of the tanks 12, 14, and 16 after they have traversed the metering sections 178 as described above. To facilitate such clean-out, the floor 70 of each collector assembly may be quickly and easily removed by simply unscrewing the wing nuts 90,92 and allowing floor 70 to drop out. The diverter valves 102 for that particular assembly are then set in the position of FIG. 8, allowing the contents of the overhead tank to drop straight through the collector passages 50, bypassing the upper loading zones 52.

It will also be appreciated that calibration of the metering unit 28 can be easily achieved in a manner somewhat similar to cleaning out of the tanks 12, 14, and 16. By removing the floor 70 from a particular collector assembly 18 and replacing it with a calibrating receptacle (not shown), product can be run through each metering section 178 and discharged into the calibrating receptacle for measurement. Desired adjustments of the appropriate components of the metering section 178 can then be readily carried out.

A variety of systems can be implemented for determining which of the hydraulic cylinders are actuated and when. An operator-based system would be permissible, for instance, with the machine operator manually flipping switches, pressing buttons, or providing input to a guided user interface in order to signal the cylinder actuation (s). An automated system could be used, as well. For instance, a system which automatically allows or prevents seed dispensation from certain metering sections based on a known seeding plan and the current position of the machine could be used. In one implementation, this system could be based on machine coordinates derived from a global navigation satellite system (GNSS) or global positioning system (GPS). Hybrid systems or other varieties of manual and/or automated systems fall within the scope of the present invention, as well. Ultimately, however, a system that allows for quick signal transmission and resulting engagement or disengagement of a selected metering roller or rollers is desirable.

In a preferred embodiment, as shown in FIG. 1, a damper assembly 258 may be added to each upper primary line 24 and lower primary line 26. The damper assembly 258 is operable to assist in the balancing of pressure across the upper primary lines 24 and lower primary lines 26, as will be described below.

As shown in FIG. 1, a fan 20 provides airflow which is distributed to the lines 24,26 via a distribution manifold 22. When no seed is being dispensed or when an equal amount of seed is being dispensed through each metering section 178, the resistance to airflow in each line 24,26 will be essentially equal (assuming that the damper assemblies 258 are each configured identically so as to identically affect the airflow). Thus, the airflow will be distributed essentially equally through the lines 24,26. However, if a selected metering section 178 is deactivated such that no seed is dispensed out of it into a respective collector assembly 18, the lack of seed flow and, in turn, the lack of airflow obstruction within the respective lines 24,26 will lead to a diversion of airflow away from the remaining partially obstructed (by seed) dispensing lines 24,26 and into the unobstructed non-dispensing lines 24,26 (again assuming equivalent damper-based effects). This will result in less airflow in the dispensing lines 24,26, leading to reduced material-carrying capacity in these lines 24,26 and increased likelihood or plugs forming in the lines 24,26.

The damper assemblies 258 address this airflow diversion and resulting deficiency by being activated in coordination with the hydraulic cylinders 198 of the metering sections 178 and, in turn, with the dispensation and stoppage of dispensation of particulate. More particularly, when a hydraulic cylinder 198 is actuated to stop the metering and dispensation of particulate material, the respective damper assembly 258 is actuated to provide a suitable degree of obstruction of the respective line 24,26 such that an airflow loss does not occur in the remaining lines 24,26. In essence, the actuated damper assembly 258 acts as a proxy for the non-dispensing seed or particulate material, providing the effect that the seed would have had if it had been dispensed. When a hydraulic cylinder is retracted such that metering and dispensation do occur, however, the damper assembly 258 is configured such that airflow is not obstructed by the damper assembly 258, the airflow instead being appropriately obstructed by the material being dispensed.

Figure 14:
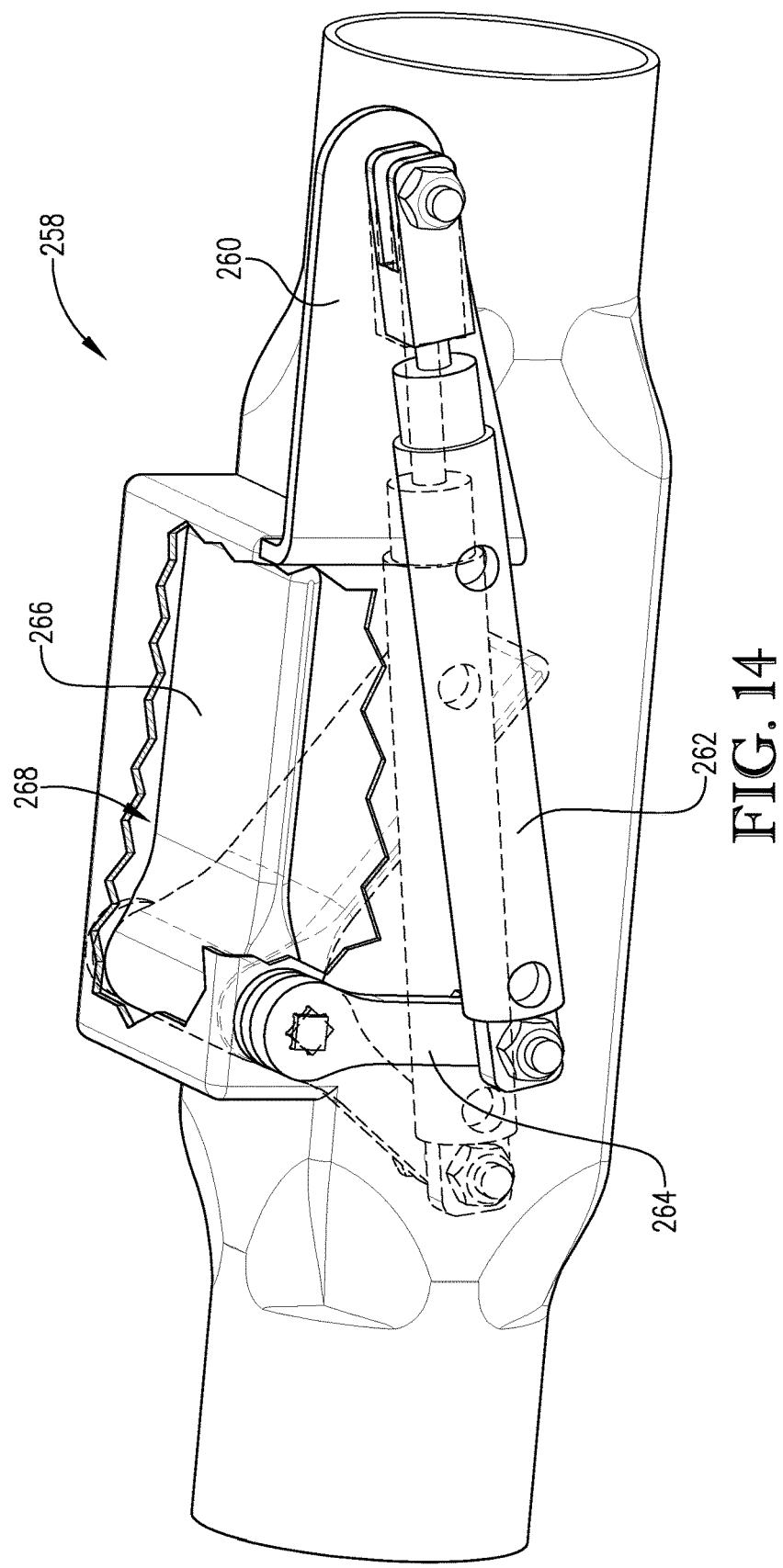
FIG. 14 is an enlarged, partially sectioned right front isometric view of a damper as shown in FIG. 1, illustrating both the engaged (dashed lines) and disengaged (solid lines) configurations.

A preferred embodiment of a damper assembly 258 is illustrated in FIGS. 14-16. As shown, the damper assembly 258 includes a mounting arm 260, a hydraulic cylinder 262, a rod 264, and a flap 266. One end of the cylinder 262 is mounted on the mounting arm 260, while the other end of the cylinder 262 connects to the rod 264. The flap 266 is fixed to the other end of the rod 264 such that a fixed angle is maintained between the rod 264 and the flap 266. The damper assembly 258 also defines a storage region 268. In the retracted cylinder configuration shown in FIG. 15, which corresponds to the (retracted cylinder) engaged metering configuration shown in FIG. 12, the rod 264 is positioned by the cylinder 262 such that the flap 266 is contained in the storage area 268 and therefore does not influence the airflow. In the extended cylinder configuration shown in FIG. 16, which corresponds to the (extended cylinder) disengaged metering configuration shown in FIG. 13, the rod 264 is positioned by the cylinder 262 such that the flap 266 angles into the body of the damper assembly 258 to thereby partially obstruct the airflow.

Although a two-position flap 266 may be used, it is also within the scope of the present invention for variable positioning of the flap to be implemented. Such positioning ability would be particularly desirable if, for instance, the metering structure provides for variable particulate flow (rather than "on" and "off," as shown) or if introduction of particulate from multiple tanks into a given line necessitates variable airflow obstruction capability for airflow balancing to occur. Furthermore, it is within the scope of the present invention for a damper to be provided to correspond to each metering roller, to just those metering rollers associated with a given metering structure (as is illustrated in FIG. 1), or to some other subset of metering rollers that is deemed appropriate for the particular circumstance.

In a preferred embodiment, the hydraulic lines (not shown) controlling the damper assemblies 258 are teed directly off of the respective hydraulic lines (not shown) controlling the respective metering sections 178. Therefore, each damper cylinder 262 is preferably fluidly connected in series to a respective one of the metering cylinders 198 (both corresponding to one of the metering sections 178) so that the cylinders are operated simultaneously. However, a variety of coordinated or independent control systems could be used in implementing a damper system. Furthermore, other airflow restriction means that vary structurally from the damper assemblies 258 described herein could be used without departing from the spirit of the present invention.

Although the damper assembly 258 is described above in the context of a machine having all of the preferred features of the present invention, it is noted that the damper assembly 258 could be implemented in air seeders having a variety of dispensing line and/or metering configurations. For instance, the damper assemblies could be implemented in a seeder having only one set of dispensing lines and making use of a shut-off gate above a metering roller to stop or start dispensation. Ultimately, the damper assemblies 258 are appropriate in any circumstance in which it is desirable to counteract the airflow imbalance that would occur between individual dispensing lines due to a change in the seed dispensation rate into one or more of them.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An agricultural air cart comprising:
a tank configured to contain particulate;
a plurality of particulate-transporting lines;
a metering system including a plurality of particulate metering sections,
each particulate metering section of said plurality of particulate metering sections being operably positioned between said tank and a respective particulate-transporting line of said particulate-transporting lines so as to control dispensation of the particulate from said tank to said respective particulate-transporting line;
an airflow generator in communication with said particulate-transporting lines so as to generate respective pneumatic-conveying airstreams within said particulate-transporting lines; and
a plurality of damper assemblies, each of which is positioned along a respective particulate-transporting line of said particulate-transporting lines downstream relative to said metering system and selectively located at least in part within the respective airstream to restrict airflow within said respective particulate-transporting line responsive to variations in metering of particulate to said respective particulate-transporting line.

2. The agricultural air cart of claim 1,
each of said damper assemblies being shiftable between an engaged configuration and a disengaged configuration,
said engaged configuration corresponding to at least partially obstructed airflow within said respective particulate-transporting line,
said disengaged configuration corresponding to at least substantially unobstructed airflow within said respective particulate-transporting line, and
each of said damper assemblies being operably coupled with a respective one of said particulate metering sections so that said damper assembly is shifted to said engaged configuration when particulate dispensation is stopped and said damper assembly is shifted into said disengaged configuration when particulate is dispensed.

3. The agricultural air cart of claim 2,
each of said damper assemblies comprising a flap movably mounted within said respective particulate-transporting line,
said flap being moved out of the airflow within said respective particulate-transporting line when said damper assembly is in said disengaged configuration, and
said flap being moved into the airflow within said respective particulate-transporting line when said damper assembly is in said engaged configuration.

4. The agricultural air cart of claim 3,
said flap being variably movable within said respective particulate-transporting line so that the extent to which airflow is obstructed by said flap is variable.

5. The agricultural air cart of claim 3,
each of said damper assemblies further comprising a damper actuator to effect moving of said flap into and out of the airflow within said respective particulate-transporting line, and
each of said damper actuators being operably coupled with a respective one of said particulate metering sections so that said damper actuator moves said flap into the airflows when particulate dispensation is stopped and said damper actuator moves said flap out of the airflow when particulate is dispensed.

6. The agricultural air cart of claim 5,
each of said particulate metering sections comprising a metering device actuator, said metering device actuator being operable to permit or stop dispensation of particulate by said particulate metering section, and each of said damper actuators being operably coupled with a respective one of said metering device actuators.

7. The agricultural air cart of claim 6, each of said damper actuators comprising a damper hydraulic cylinder, each of said metering device actuators comprising a metering device hydraulic cylinder; and a hydraulic system operably coupled to each said damper hydraulic cylinder and each said metering device hydraulic cylinder, with each said damper hydraulic cylinder being fluidly coupled with a respective one of said metering device hydraulic cylinders so that both are controlled simultaneously by said hydraulic system.

8. The agricultural air cart of claim 5, said flap being variably movable within said respective particulate-transporting line so that the extent to which airflow is obstructed by said flap is variable.

9. The agricultural air cart of claim 1, each particulate metering section of said plurality of particulate metering sections comprising a shiftable gate in communication with said tank, with shifting of said shiftable gate controlling particulate dispensation.

* * * * *